(12) United States Patent
DeRose

(10) Patent No.: US 6,308,578 B1
(45) Date of Patent: Oct. 30, 2001

(54) FORGE PROTECTION DEVICE AND METHOD

(76) Inventor: Dayne DeRose, 110 Bloomfield Ave., Nutley, NJ (US) 07110

( * ) Notice: Subject to any disclaimer, the term of this patent is extended or adjusted under 35 U.S.C. 154(b) by 0 days.

(21) Appl. No.: 09/441,815

(22) Filed: Nov. 17, 1999

Related U.S. Application Data

(60) Provisional application No. 60/108,907, filed on Nov. 18, 1998.

(51) Int. Cl.$^7$ ........................................... G01B 7/16
(52) U.S. Cl. ............................................. 73/780
(58) Field of Search ........................ 73/774, 776, 777, 73/780, 862.381, 862.473, 862.68

(56) References Cited

U.S. PATENT DOCUMENTS

| | | | |
|---|---|---|---|
| D. 320,475 | 10/1991 | Jeter, Jr. ........................... | D29/10 |
| 543,086 | 7/1895 | Donovan . | |
| 3,302,214 | 2/1967 | Yuritch . | |
| 3,771,786 | 11/1973 | Bouldin ............................. | 273/1 E |
| 3,866,909 | 2/1975 | DeSantis ........................... | 272/76 |
| 4,565,366 | 1/1986 | Struss ............................... | 272/76 |
| 4,634,917 | 1/1987 | Dvorsky et al. .................. | 310/328 |
| 4,653,582 | 3/1987 | Ehrenfried ....................... | 116/222 |
| 4,761,005 | 8/1988 | French et al. ................... | 273/1 GC |
| 4,763,284 | 8/1988 | Carlin ............................... | 364/550 |
| 4,824,107 | 4/1989 | French ............................. | 273/1 GC |
| 4,974,833 | 12/1990 | Hartman et al. .................. | 272/76 |
| 5,159,316 | 10/1992 | Lazzara ............................ | 340/568 |
| 5,176,450 | 1/1993 | Loftus ............................... | 374/164 |
| 5,184,831 | 2/1993 | Garner .............................. | 273/455 |
| 5,195,752 | 3/1993 | Reeves et al. .................... | 273/374 |
| 5,401,922 | 3/1995 | Asta .................................. | 200/5 A |
| 5,550,339 | 8/1996 | Haugh .............................. | 200/5 A |
| 5,553,860 | 9/1996 | Zelikovich ....................... | 273/371 |
| 5,570,881 | 11/1996 | Lau .................................... | 273/57.3 |
| 5,856,644 | 1/1999 | Burgess ............................ | 200/61.43 |

FOREIGN PATENT DOCUMENTS 1045893   3/1981   (SU) .

Primary Examiner—Max Noori
(74) Attorney, Agent, or Firm—Hodgson Russ LLP

(57) ABSTRACT

A device for and method of detecting application of a force is disclosed. The device has a first layer of electrically conductive material, and a first conductor electrically coupled to the first layer. The device also has a second layer of electrically conductive material, and a second conductor electrically coupled to the second layer. An electrical power supply is connected to the first conductor, and a transmitter is connected to the second conductor. The transmitter is capable of transmitting a signal when an electric charge moves from the first layer to the second layer. Finally, a resiliently compressible third layer of non-electrically-conductive porous material is disposed between the first layer and the second layer, and separates the first layer and the second layer a sufficient distance to prevent an electric charge from moving between the first and second layers, except when one of the conductive layers receives an impact.

18 Claims, 5 Drawing Sheets

FORGE PROTECTION DEVICE AND METHOD

CROSS-REFERENCE TO RELATED APPLICATION

This application claims priority to an earlier filed U.S. provisional patent application, U.S. provisional patent application Serial No. 60/108,907, which was filed on Nov. 18, 1998, and is incorporated herein by reference.

BACKGROUND OF THE INVENTION

1. Field of the Invention

The present invention relates generally to devices and methods for detecting application of a force. More specifically, the present invention is a device for and method of determining when a participant in a sporting event has been contacted.

2. Discussion of Related Art

In the prior art, there are devices for generating an analog output signal indicative of an impact to a transducer. The transducer is mounted on protective equipment utilized in various martial arts fields, such as protective vests and the like, or can be mounted on training equipment, such as a heavy bag, striking pad, etc.

The transducer of the prior art device is a piezoelectric film which, upon deformation, generates an electrical signal which is indicative of the amount of deformation. By placing the piezoelectric film on top of a deformable material, or sandwiching it in the deformable material, impacts to the deformable material will strain the piezoelectric film generating the signal output. The transducer may be connected to a transmitter and remote receiver for providing an indication of the impact at a remote location.

Such prior art devices have deficiencies. For example, they are expensive.

SUMMARY OF THE INVENTION

Accordingly, it is an object of the present invention to provide a device and method for detecting application of a force.

The foregoing objectives are realized by the present invention which includes a device for detecting application of a force. The device has a first layer of electrically conductive material and a first conductor electrically coupled to the first layer. The device also has a second layer of electrically conductive material and a second conductor electrically coupled to the second layer. An electrical power supply is connected to the first conductor, and a transmitter is connected to the second conductor. The transmitter is capable of transmitting a signal when an electric charge moves from the first layer to the second layer. Finally, a resiliently compressible third layer of non-electrically-conductive porous material is disposed between the first layer and the second layer, and separates the first layer and the second layer a sufficient distance to prevent an electric charge from moving between the first and second layers, except when a force is applied to one of the conductive layers. When a force is applied to one of the conductive layers the third layer is compressed such that the distance between the first and second layers is small enough to permit an electric charge to move between the first and second layers.

A method according to the present invention provides for indicating when a force has been applied to a body. First, a force detection device is provided. The force detection device may be similar to that described above having two conductive layers and a compressible third layer between the conductive layers. Next, a force is applied to at least one of the conductive layers to compress the third layer a sufficient distance to permit an electric charge to pass between the conductive layers. Then, the electric charge is sensed, and a signal is transmitted to indicate application of the force.

BRIEF DESCRIPTION OF THE DRAWINGS

For a fuller understanding of the nature and objects of the invention, reference should be made to the following detailed description taken in conjunction with the accompanying drawings, in which.

BEST MODE FOR CARRYING OUT THE INVENTION

Figure 1:
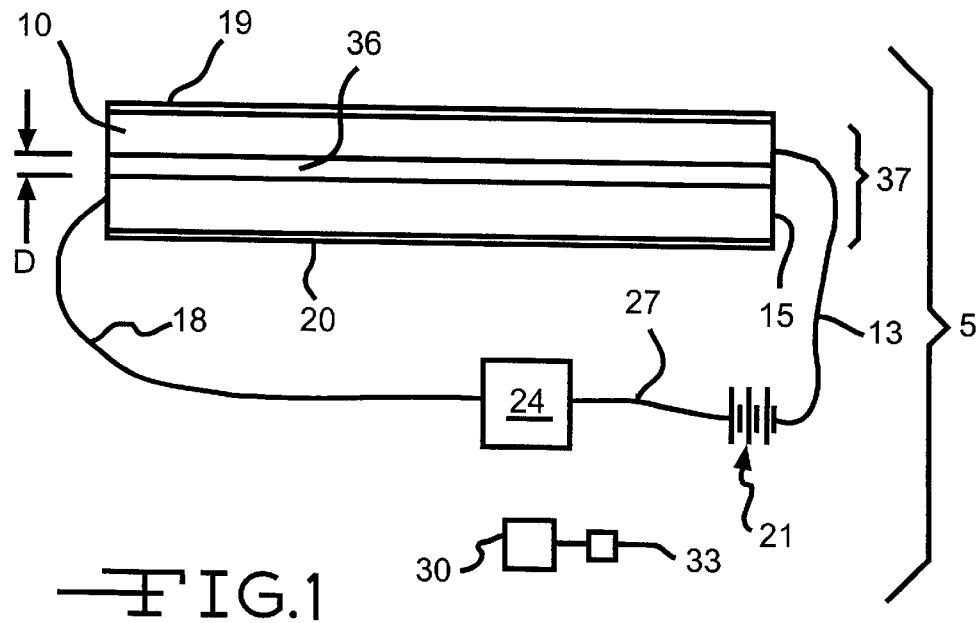
FIG. 1 is a schematic depicting a first embodiment of the present invention.

FIG. 1 is a schematic depicting a device 5 according to the present invention. The device 5 includes a first layer 10 of electrically conductive material, and also includes a first conductor 13 electrically coupled to the first layer 10. The present invention also includes a second layer 15 of electrically conductive material, and also includes a second conductor 18 electrically coupled to the second layer 15. The first and second layers 10, 15 are preferably made from a pliable material such as a metallic lame mesh.

The device 5 may include protective layers 19, 20. The protective layers 19, 20 each cover at least part of the first and second layers 10, 15 respectively. Preferably, the protective layers 19, 20 are water resistant to guard against perspiration entering the first layer 10 or the second layer 15, and ultimately providing a conductive pathway between the first layer 10 and second layer 15.

An electrical power supply 21, which may be a battery, is connected to the first conductor 13, and a transmitter 24 is connected to the second conductor 18. The power supply 21 and the transmitter 24 are electrically connected via a third conductor 27 so that when the first layer 10 is forced close to the second layer 15, an electric charge is allowed to move from the first layer 10 to the second layer 15.

The present invention further includes a receiver 30 connected to an emitter 33. The receiver 30 is tuned to sense a signal S transmitted by transmitter 24.

As shown in FIG. 1, the present invention includes a resiliently compressible third layer 36 of non-electrically-conductive, porous material disposed between the first layer 10 and the second layer 15. The third layer 36 may be a loosely woven nylon fabric. The third layer 36 separates the first layer 10 and the second layer 15 a sufficient distance D to prevent an electric charge from moving between the first and second layers 10, 15 except when a force is applied to the first layer 10 or second layer 15. The first, second and third layers 10, 15, 36 may be combined into an integrated unit 37 by stitching the three layers together with thread.

Figure 2:
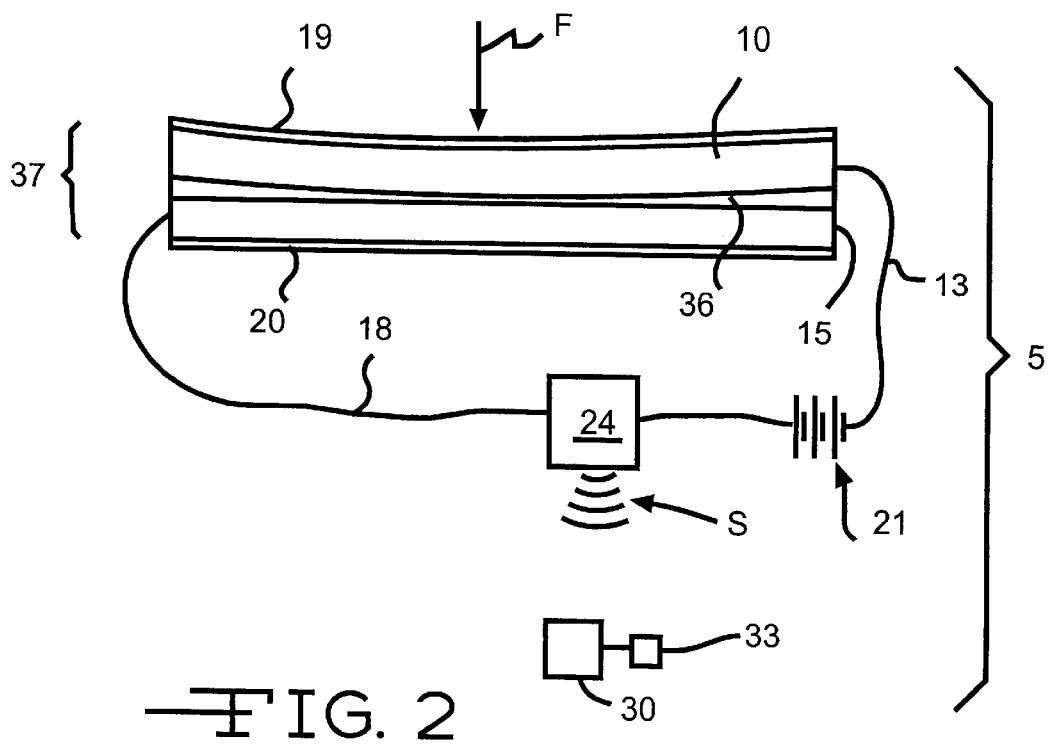
FIG. 2 is a schematic showing how the embodiment shown in FIG. 1 reacts to application of a force.

For example, as depicted in FIG. 2, when the first layer 10 receives a force, indicated by the arrow F, the first layer 10 deflects toward the second layer 15 and the third layer 36 is compressed such that the first layer 10 and the second layer 15 are separated by a distance less than the distance D at the location where the force F is applied. When the distance between the first layer 10 and the second layer 15 is narrowed sufficiently, an electric charge moves between the first and second layers 10, 15. Once the force F is no longer applied to the first layer 10, the third layer 36 expands to return the first layer 10 to its original position, such that the first layer 10 and the second layer 15 are separated by the distance D.

Figure 3:
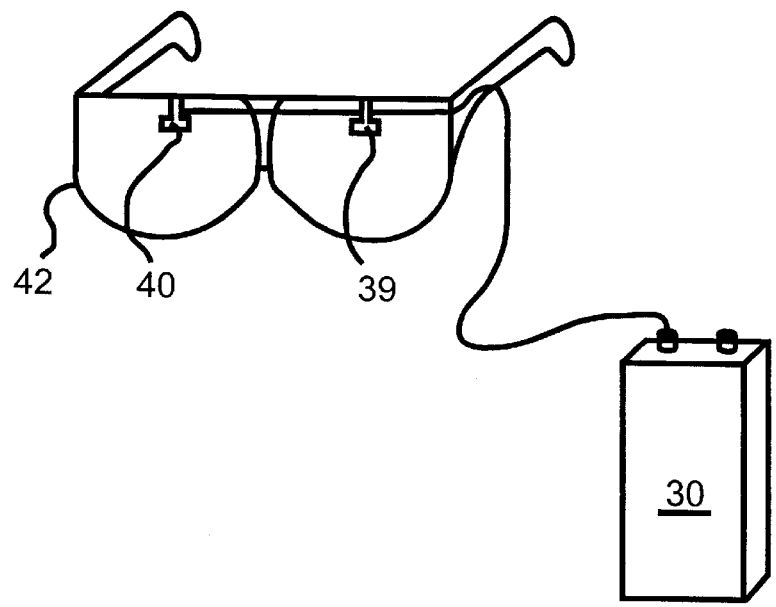
FIG. 3 is a perspective view of an embodiment of the emitter shown in FIGS. 1 and 2.

The transmitter 24 senses the electric charge moving from the first layer 10 to the second layer 15, and in response, the transmitter 24 sends a signal S, which may be an electromagnetic signal. The signal S is received by the receiver 30, which in turn causes the emitter 33 to emit a human detectable signal, such as, for example, a visually or audibly detectable signal. The emitter 33 may be a light emitting diode or a buzzer. In an embodiment of the present invention, emitter 33 is a light emitting diode 39 mounted on a pair of glasses 42 as shown in FIG. 3. The pair of glasses 42 may be fitted with two light emitting diodes 39, 40, whereby the first light emitting diode 39 emits light when a first participant is struck, and the second light emitting diode 40 emits light when a second participant is struck. The pair of glasses 42 may be worn by a referee of a sporting event.

The emitter 33 may be designed to emit a human detectable signal whenever the signal S is received. Alternatively, the emitter 33 may be designed to emit a human detectable signal only in response to a first force in a situation where more than one contestant wears a device 5 and the first force F is applied to one of the devices 5 shortly before a second force F is applied to the other of the devices 5.

Figure 4:
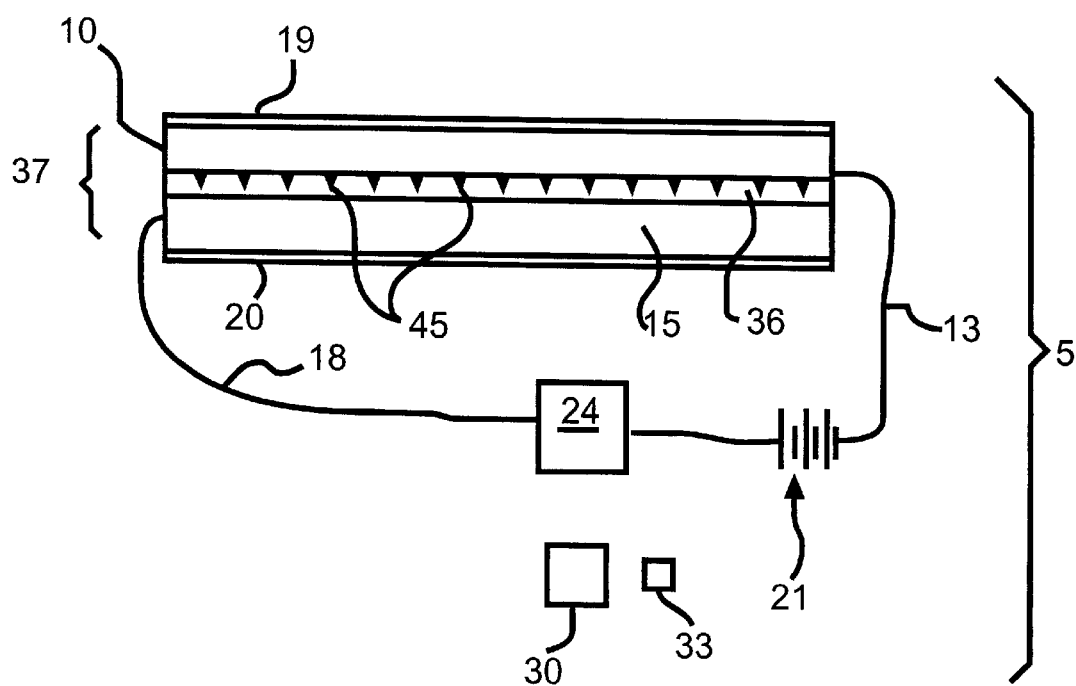
FIG. 4 is a schematic of a second embodiment of the present invention.

In an alternative embodiment of the present invention shown in FIG. 4, the first layer 10 has conductive projections 45 extending from the first layer 10 toward the third layer 36. When the force F is received by the first layer 10 or the second layer 15, the projections 45 extend into the third layer 36 and permit an electric charge to pass between one or more of the projections 45 and the second layer 15. The projections 45 may extend only from the first layer 10, only from the second layer 15, or from both the first layer 10 and second layer 15.

Figure 5:
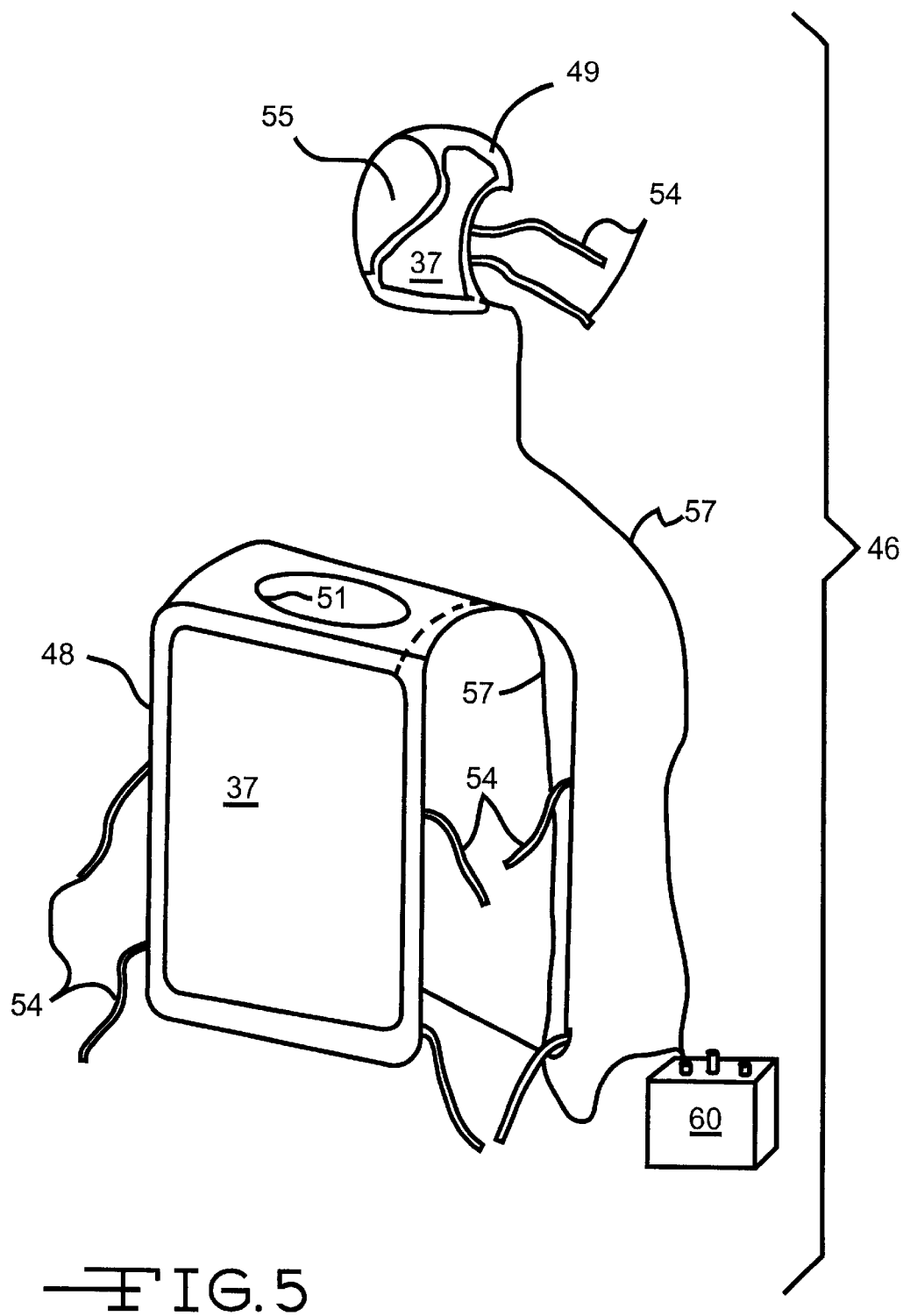
FIG. 5 is a perspective view of a third embodiment of the present invention.

As shown in FIG. 5, the integrated unit 37 may be mounted on articles of clothing 46, such as a vest 48 or a helmet 49. The vest 48 or helmet 49 (or both) is intended to be worn by a participant in a sporting event, such as for example, a karate or boxing match. Integrated units 37 are positioned on the articles of clothing 46 such that when the articles of clothing 46 are worn, the integrated units 37 are positioned in an area likely to receive a force, for example, a kick or punch from an opponent participating in the sporting event.

The vest 48 has a hole 51 therethrough for permitting the participant's neck to extend through the hole 51, and also has ties 54 for securing the vest 48 around the participant's torso. The helmet 49 has ties 54 for securing the helmet 49 to a participant's head, and further includes a transparent shield 55 to allow the participant to see through the shield 55. The first and second conductors 13, 18 are shown in FIG. 5 in a combined set of wires 57 extending from the first and second layers 10, 15 of the integrated units 37 to a combination power supply and transmitter unit 60. The combination power supply and transmitter unit 60 has both a power supply electrically connected to the first layer 10 as described above, and a transmitter electrically connected to the second layer 15 as described above. The combination power supply and transmitter unit 60 may be attached to a belt (not shown) worn by the participant, attached to the vest 48 or helmet 49.

Figure 6:
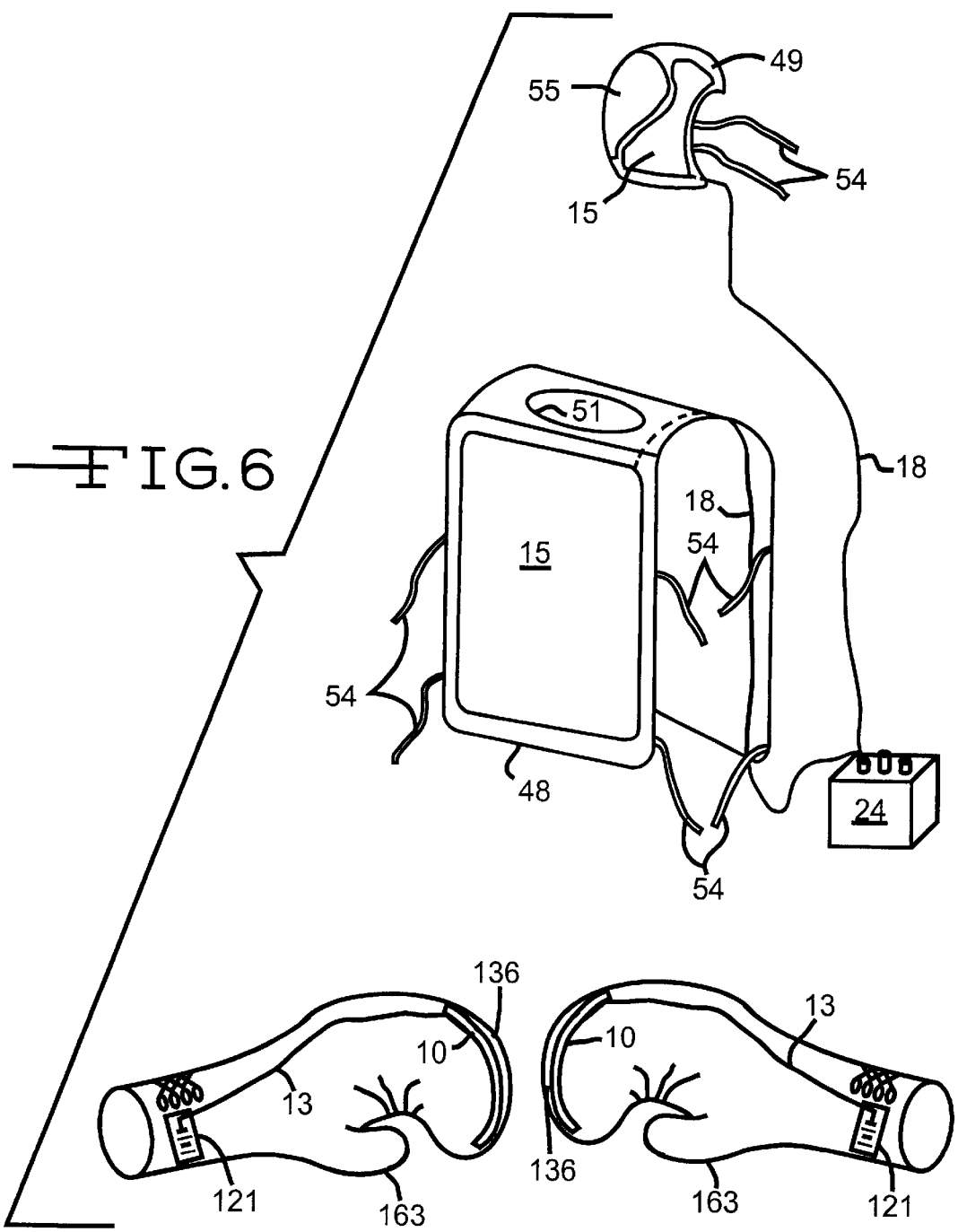
FIG. 6 is a perspective view of a fourth embodiment of the present invention.
Figure 7:
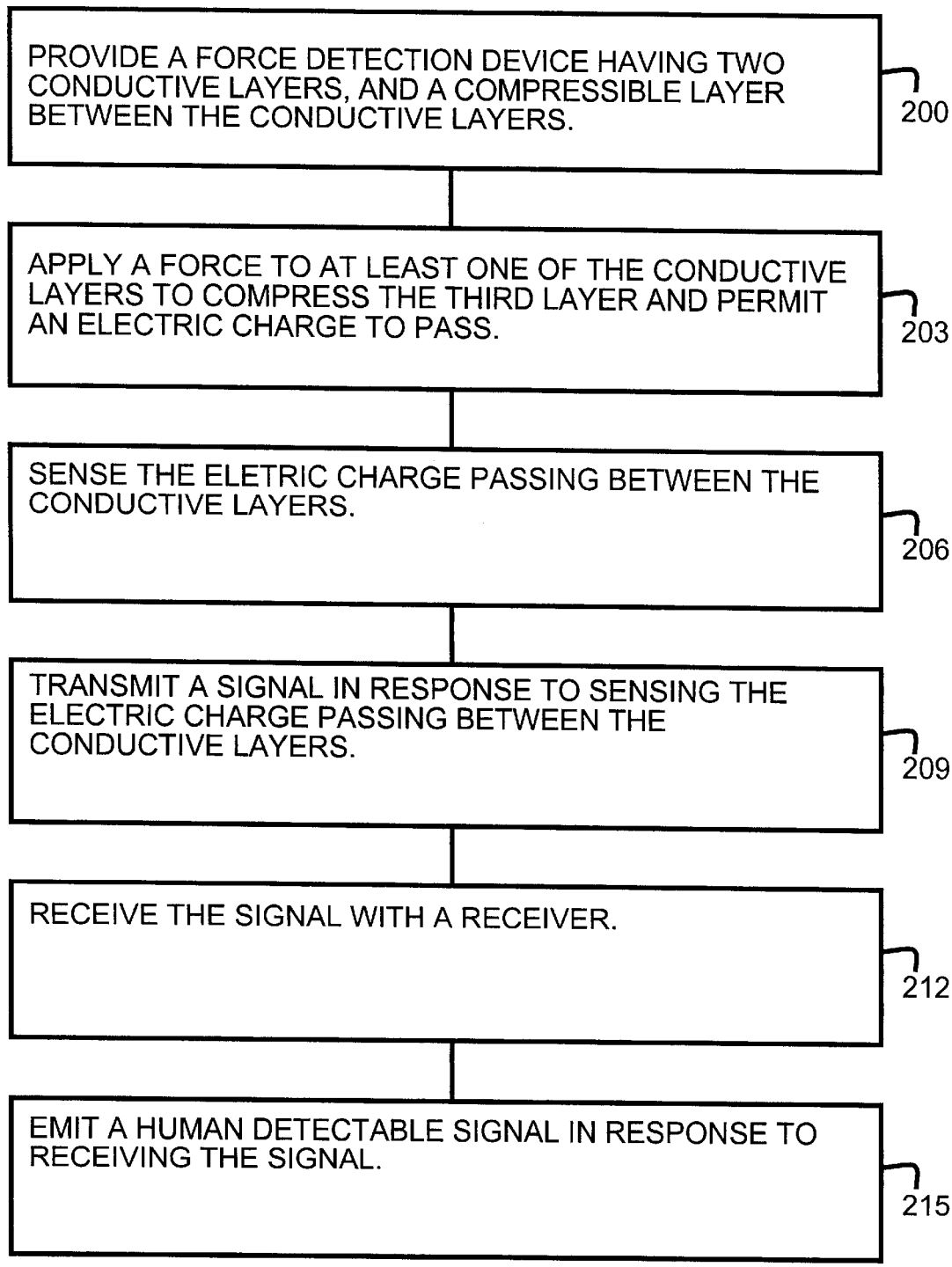
FIG. 7 shows the steps of a method according to the present invention.

FIG. 6 depicts another embodiment of the present invention that includes the first layer 10 of electrically conductive material on a contacting body 163, and the second layer 15 of electrically-conductive material on one or more articles of clothing, such as the vest 48 and helmet 49. The first layer 10 is electrically connected to a first conductor 13, and the second layer 15 is electrically connected to the second conductor 18. An electrical power supply 121 is connected to the first conductor 13. The transmitter 24 is connected to the second conductor 18 and is capable of indicating when an electric charge moves between the first layer 10 and the second layer 15. An optional third layer 136 of non-electrically-conductive, porous, pliable material may cover the first layer 10, as shown in FIG. 6. Alternatively, the optional third layer 136 covers the second layer 15, or may cover both the first layer 10 and the second layer 15. When the contacting body 163 strikes the vest 48 or helmet 49 in the area covered by the second layer 15, an electric charge moves between the first layer 10 and the second layer 15. The transmitter 24 sends a signal to a receiver in a manner similar to that described above, in order ultimately to emit a human detectable signal.

The present invention also includes a method of indicating application of a force. In the method, a force detection device according to the present invention is provided (step 200). The force detection device preferably has (a) a first layer of electrically conductive material, (b) a first conductor electrically coupled to the first layer, (c) a second layer of electrically conductive material, (d) a second conductor electrically coupled to the second layer, (e) an electrical power supply connected to the first conductor, (f) a transmitter connected to the second conductor and capable of transmitting a signal when an electric charge moves from the first layer to the second layer, and (g) a resiliently compressible third layer of material disposed between the first layer and the second layer, the third layer being non-electrically-conductive and porous. A force is applied (step 203) to at least one of the conductive layers to compress the third layer a sufficient distance to permit an electric charge to pass between the first and second layers. Then the electric charge passing between the first and second layers is sensed (step 206). In response to sensing the electric charge, the signal is transmitted (step 209) with the transmitter to indicate application of the force.

Additional steps in the method according to the present invention may be added to those described above. Such additional steps may include receiving the signal with a receiver (step 212) and emitting a human detectable signal (step 215) in response to receiving the signal. A running tally of the human detectable signals may be kept and ultimately used to determine a winner of a match between contestants.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A force detection device, comprising:
   a first layer of electrically conductive material;
   a first conductor electrically coupled to the first layer;
   an electrical power supply connected to the first conductor;
   a second layer of electrically conductive material;
   a second conductor electrically coupled to the second layer;
   a transmitter connected to the second conductor and capable of transmitting a signal in response to application of an impact force applied to one of the layers of electrically conductive material when an electric charge moves from one of the electrically conductive layers to another of the electrically conductive layers;
   a resiliently compressible third layer of non-electrically-conductive porous material disposed between the first layer and the second layer, the third layer having a first state separating the first layer and the second layer a sufficient distance to prevent an electric charge from moving from one of the electrically conductive layers to another of the electrically conductive layers, and when an impact force is applied to one of the conductive layers the third layer is compressed and permits an electric charge to move from one of the electrically conductive layers to another of the electrically conductive layers, and
   an article of clothing for wearing by a person, the article of clothing having the first, second and third layers joined to the article of clothing in an area likely to receive an impact force.

2. The force detection device of claim 1, wherein the electrical power supply is a battery.

3. The force detection device of claim 1, further including a receiver, in communication with and capable of receiving the signal from the transmitter once the electric charge moves from one of the electrically conductive layers to another of the electrically conductive layers.

4. The force detection device of claim 3, further including an emitter connected to the receiver, the emitter being capable of emitting a human detectable signal once the receiver receives the signal from the transmitter.

5. The force detection device of claim 4, further comprising a pair of glasses joined to the emitter.

6. The force detection device of claim 5, wherein the emitter emits light.

7. The force detection device of claim 1, wherein the third layer includes nylon.

8. The force detection device of claim 1, wherein the first layer includes a metallic mesh.

9. The force detection device of claim 1, wherein the second layer includes a metallic mesh.

10. The method of claim 1, wherein at least one of the layers of electrically conductive material is a lamé mesh.

11. The force detection device of claim 10 wherein the first layer is pliable.

12. The force detection device of claim 10 wherein the second layer is pliable.

13. The force detection device of claim 1, further including conductive projections joined to and extending from at least one of the conductive layers toward the third layer, the projections extending into the third layer when an impact force is applied to either one of the conductive layers.

14. A force detection device, comprising:
   a first layer of electrically conductive material on a first article of clothing;
   a first conductor electrically coupled to the first layer;
   an electrical power supply connected to the first conductor;
   a second layer of electrically-conductive material on a second article of clothing;
   a second conductor electrically coupled to the second layer; and
   a transmitter connected to the second conductor and capable of transmitting a signal when an electric charge moves from one of the electrically conductive layers to another of the electrically conductive layers as a result of an impact force applied by the first article of clothing to the second article of clothing.

15. The force detection device of claim 14 further comprising a resiliently compressible third layer of non-electrically-conductive porous material covering the first layer.

16. A method of indicating application of a force, comprising:
   providing an article of clothing having a force detection device, the force detection device having (a) a first layer of electrically conductive material, (b) a first conductor electrically coupled to the first layer, (c) a second layer of electrically conductive material, (d) a second conductor electrically coupled to the second layer, (e) an electrical power supply connected to the first conductor, (f) a transmitter connected to the second conductor and capable of transmitting a signal when an electric charge moves from one of the electrically conductive layers to another of the electrically conductive layers, and (g) a third layer of material disposed between the first layer and the second layer, the third layer being non-electrically-conductive, porous, compressible, and pliable;
   applying an impact force to at least one of the conductive layers to compress the third layer a sufficient distance to permit an electric charge to pass from one of the electrically conductive layers to another of the electrically conductive layers;
   sensing the electric charge; and
   transmitting the signal with the transmitter in response to sensing the electric charge to indicate application of the impact force.

17. The method of claim 16 further comprising:
   receiving the signal with a receiver and emitting a human detectable signal in response to receiving the signal.

18. The method of claim 16, wherein at least one of the layers of electrically conductive material is a lamé mesh.

* * * * *

UNITED STATES PATENT AND TRADEMARK OFFICE
CERTIFICATE OF CORRECTION

PATENT NO. : 6,308,578 B1
DATED : October 30, 2001
INVENTOR(S) : Dayn DeRose

It is certified that error appears in the above-identified patent and that said Letters Patent is hereby corrected as shown below:

<u>Title page,</u>
Item [54], delete "FORGE PROTECTION" and replace with -- FORCE DETECTION --.

Signed and Sealed this

Twenty-ninth Day of October, 2002

*Attest:*

*Attesting Officer*

JAMES E. ROGAN
*Director of the United States Patent and Trademark Office*